(12) United States Patent
Repp et al.

(10) Patent No.: US 9,345,363 B2
(45) Date of Patent: May 24, 2016

(54) SALAD SPINNER WITH ANGLED BLADE FAN

(71) Applicants: Timothy C. Repp, Pleasant Valley, CT (US); Thomas B Murphy, Arlington, TX (US)

(72) Inventors: Timothy C. Repp, Pleasant Valley, CT (US); Thomas B Murphy, Arlington, TX (US)

( * ) Notice: Subject to any disclaimer, the term of this patent is extended or adjusted under 35 U.S.C. 154(b) by 78 days.

(21) Appl. No.: 13/898,227

(22) Filed: May 20, 2013

(65) Prior Publication Data

US 2014/0338546 A1 Nov. 20, 2014

(51) Int. Cl.
*A23B 5/00* (2006.01)
*A47J 43/044* (2006.01)
*A47J 43/24* (2006.01)
*F16D 65/14* (2006.01)
*F16D 121/14* (2012.01)
*F16D 125/58* (2012.01)

(52) U.S. Cl.
CPC ............... *A47J 43/044* (2013.01); *A47J 43/24* (2013.01); *F16D 65/14* (2013.01); *F16D 2121/14* (2013.01); *F16D 2125/585* (2013.01)

(58) Field of Classification Search
CPC .......................................................... A47J 43/24
USPC ................. 99/454, 536, 495, 511; 210/380.1, 210/360.1, 474, 477
See application file for complete search history.

(56) References Cited

U.S. PATENT DOCUMENTS

| | | | | |
|---|---|---|---|---|
| 5,064,535 | A * | 11/1991 | Hsu ............................ | 210/380.1 |
| 2009/0211460 | A1 * | 8/2009 | So et al. ......................... | 99/495 |
| 2010/0263555 | A1 * | 10/2010 | Mah ........................ | A47J 43/24 99/495 |

\* cited by examiner

*Primary Examiner* — Phuong Nguyen
(74) *Attorney, Agent, or Firm* — Daniel V. Thompson

(57) ABSTRACT

A salad spinner has a support frame with a receiving aperture. A colander is supported by the support frame in the receiving aperture for rotation about an axis of rotation. A removable drive assembly is removably coupled to the support frame and colander, and the removable drive assembly includes an actuator to transmit a driving input applied to the actuator to rotate the colander. A fan having a plurality of angled blades is mechanically coupled to the actuator to force air into the colander.

13 Claims, 9 Drawing Sheets

SALAD SPINNER WITH ANGLED BLADE FAN

CROSS-REFERENCE TO RELATED APPLICATIONS

This is a continuation-in-part of U.S. patent application Ser. No. 12/753,300 filed on Apr. 2, 2010, which was a non-provisional application based on U.S. Provisional Patent Application Ser. No. 61/211,653 filed on Apr. 2, 2009.

TECHNICAL FIELD

The present invention relates to an improved food preparation product. More particularly, it is a rotatable greens drying device (hereinafter, salad spinner) that decreases the time and effort required to dry washed greens by more effectively removing surface moisture by means of an integral air circulation mechanism and rotational forces.

BACKGROUND OF THE INVENTION

Salad spinner devices are common and not new to the marketplace. All known salad spinners are designed to create centrifugal force that expedites removal of residual water which accumulates after rinsing leafy vegetables. This is done to avoid soggy greens which can detract from the texture and quality of a salad. Each known device in the prior art employs a mechanical method for swiftly rotating a perforated container filled with rinsed greens inside a vessel that captures and contains water after its removal. This mechanical method is not the subject of this disclosure as it could be satisfactorily achieved by using one of several drive mechanisms already known in the public domain.

Most salad spinner devices consist of five main components: (1) a rigid and stationary exterior main bowl with (2) an exterior lid, (3) an interior rotatable colander with (4) an engageable interior lid, and (5) a rotary drive device that is fastened to the exterior lid which when activated by the user, spins the interior lid and colander in unison. The exterior lid, rotary drive, and interior lid are usually combined in a lid assembly. The user typically will fill the colander with leafy greens and wash them thoroughly under a faucet. Then, the dripping colander is placed inside the main bowl on a countertop, the lid assembly (containing the exterior lid, interior lid and the rotary device) is placed on top of the bowl and the user activates the rotary drive device to create the centrifugal force needed to remove water from the greens. Unfortunately, because of the nature of the centrifugal force, the contents are thrust outward against the perforated inner walls of the colander, obstructing the very holes meant to allow water to escape. Many times the user must stop and 'fluff up' the contents and spin again for adequate results.

There is a need, then, for a salad spinner device that, in conjunction with centrifugal force, includes features that accelerate drying time while making less work for the user.

SUMMARY OF THE INVENTION

The salad spinner of the present invention includes a colander adapted to be supported over a sink or basin or on a flat surface. When a removable drive assembly is actuated, it rotates the colander creating the desired centrifugal force. A fan rotating with the colander forces air from outside and above the salad spinner into and through the colander and into the bottom of the salad spinner.

BRIEF DESCRIPTION OF THE DRAWINGS

A more complete understanding of the invention and its advantages will be apparent from a review of the Detailed Description in conjunction with the following Drawings, in which.

DETAILED DESCRIPTION

Figure 1:
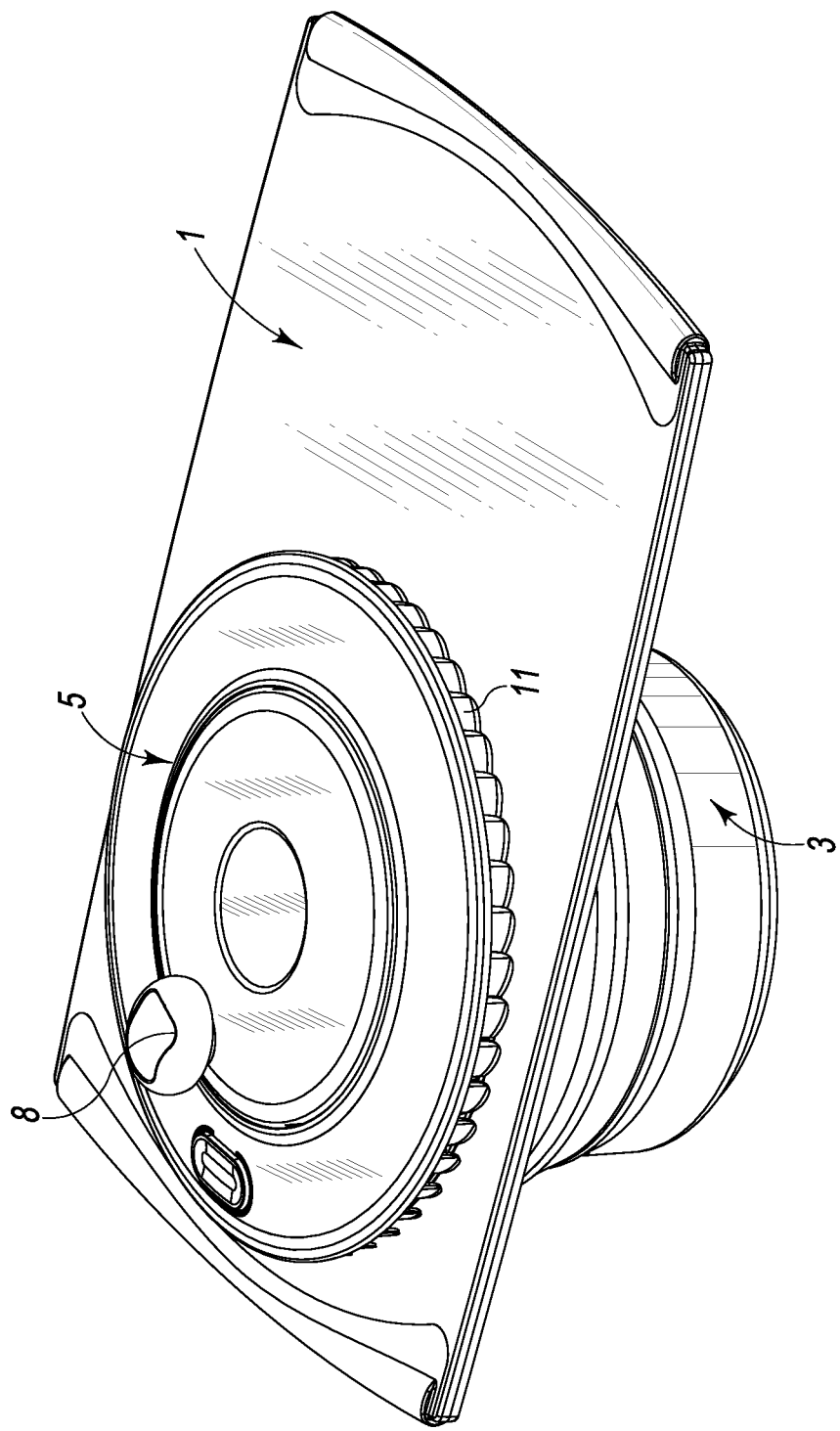
FIG. 1 is a perspective view of a first embodiment of a salad spinner constructed in accordance with the invention, with perforations in the colander omitted for clarity.

Referring initially to FIGS. 1-4, where like numerals indicate like and corresponding elements, the user places the support frame 1 over the top perimeter of a sink or basin (not shown). The collapsible, flexible colander 3 rests on a receiving aperture 4 within the support frame 1. Leafy greens are placed inside the colander 3, washed with water and spread evenly. The removable drive assembly 5, with attached fan 7 and actuator 8, is removably coupled to the support frame and colander by placing it on top of the support frame 1 directly above the colander 3. The removable drive assembly 5 self-locates with the fan 7 affixed to the colander rim 9 so as to transfer driving input from actuator 8 and the mechanical output of the removable drive assembly 5 to the fan 7 and attached colander 3. The removable drive assembly 5 is then actuated, gradually rotating the colander 3 about an axis of rotation (not shown) to initiate centrifugal force which begins removal of water from the leafy greens. As speed increases, radial vanes 11 within the removable drive assembly 5 permit dry air to flow into the fan 7 and be forced through the leafy greens and the colander holes 13. The user then lifts the removable drive assembly 5 from the top of the support frame 1 and either removes the leafy greens by hand, or alternatively lifts out the colander 3 from the support frame 1 and pours the leafy greens into a separate bowl for consumption.

Figure 2:
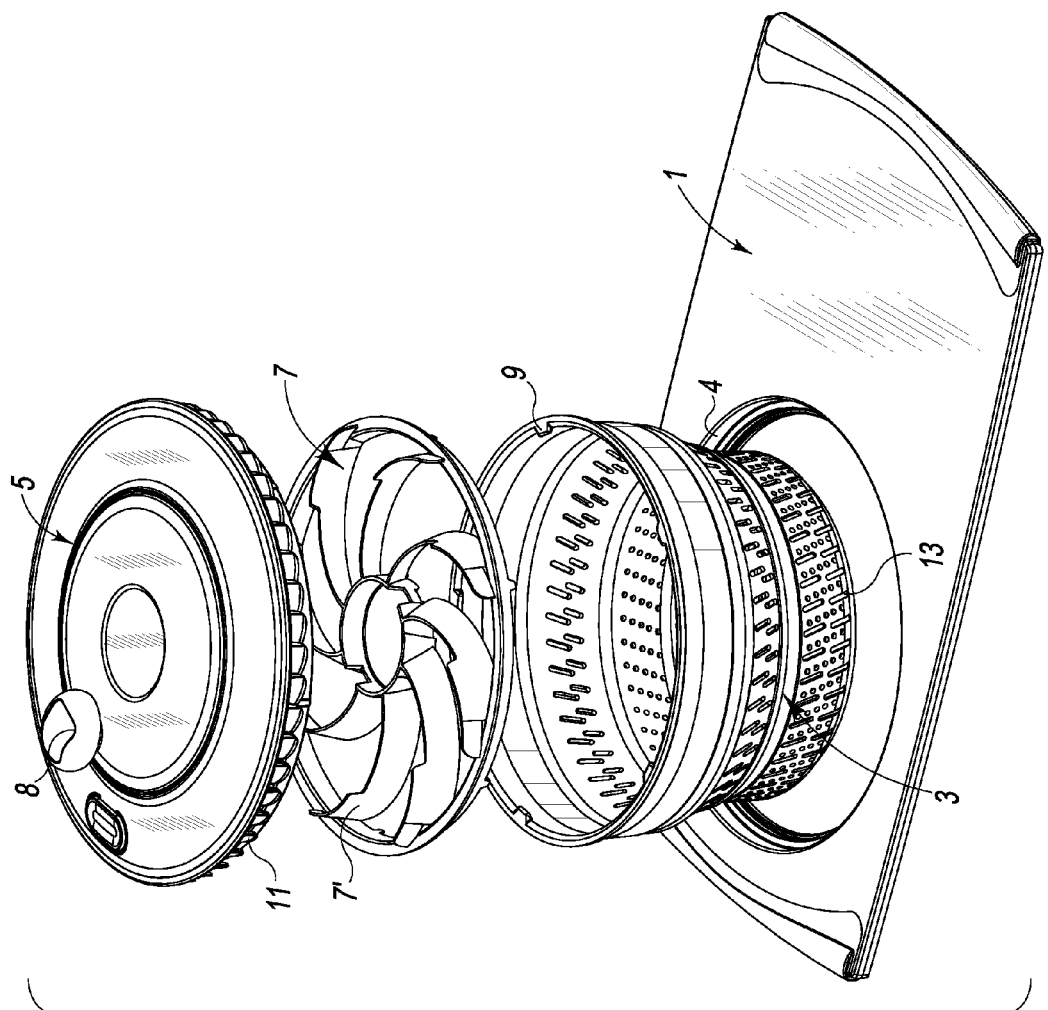
FIG. 2 is an exploded perspective view of the salad spinner of FIG. 1 showing the removable drive assembly, the fan, colander, and support frame.
Figure 3:
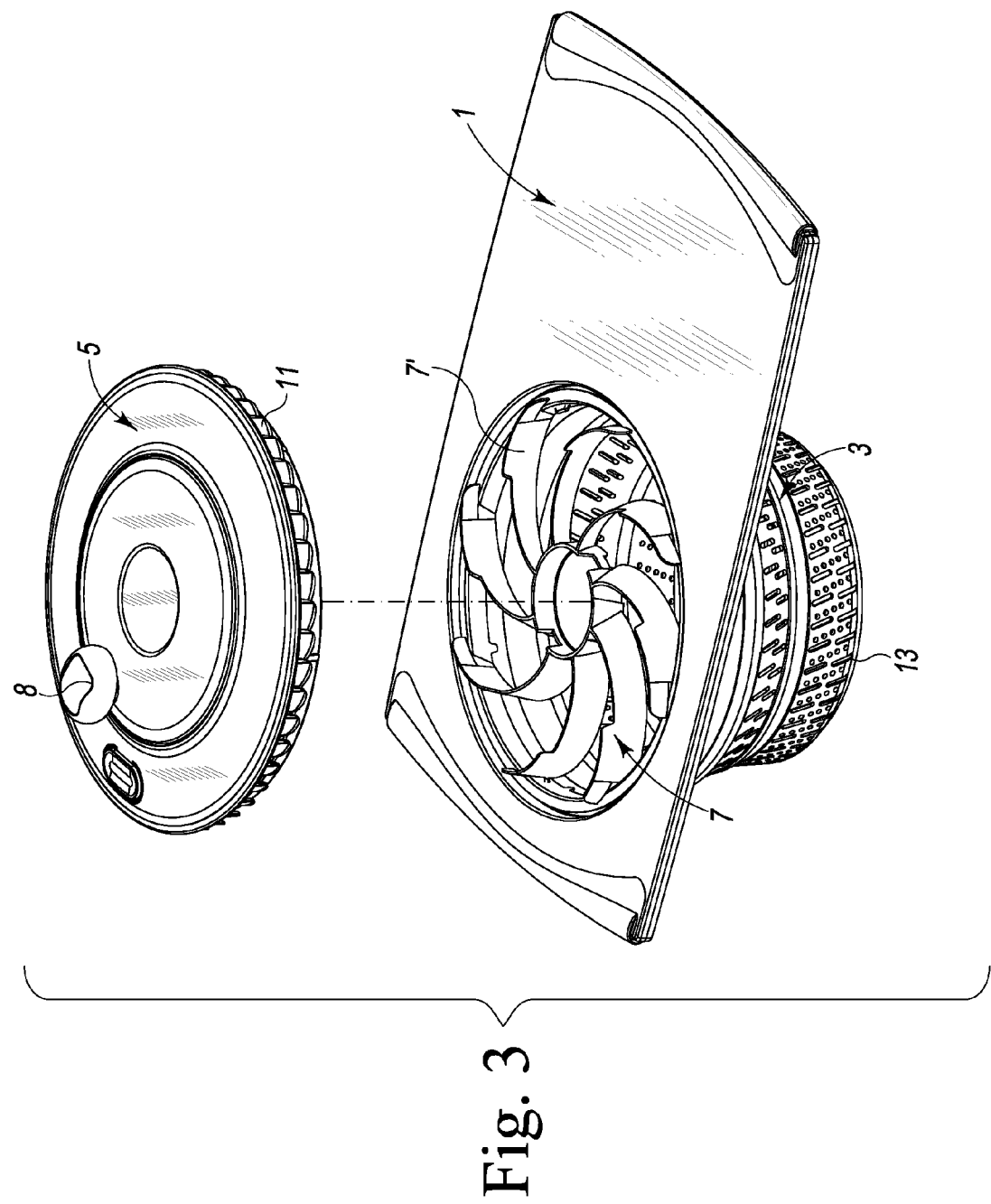
FIG. 3 is a perspective view of the Salad Spinner of FIG. 1 in the use configuration with removable drive assembly removed.
Figure 4:
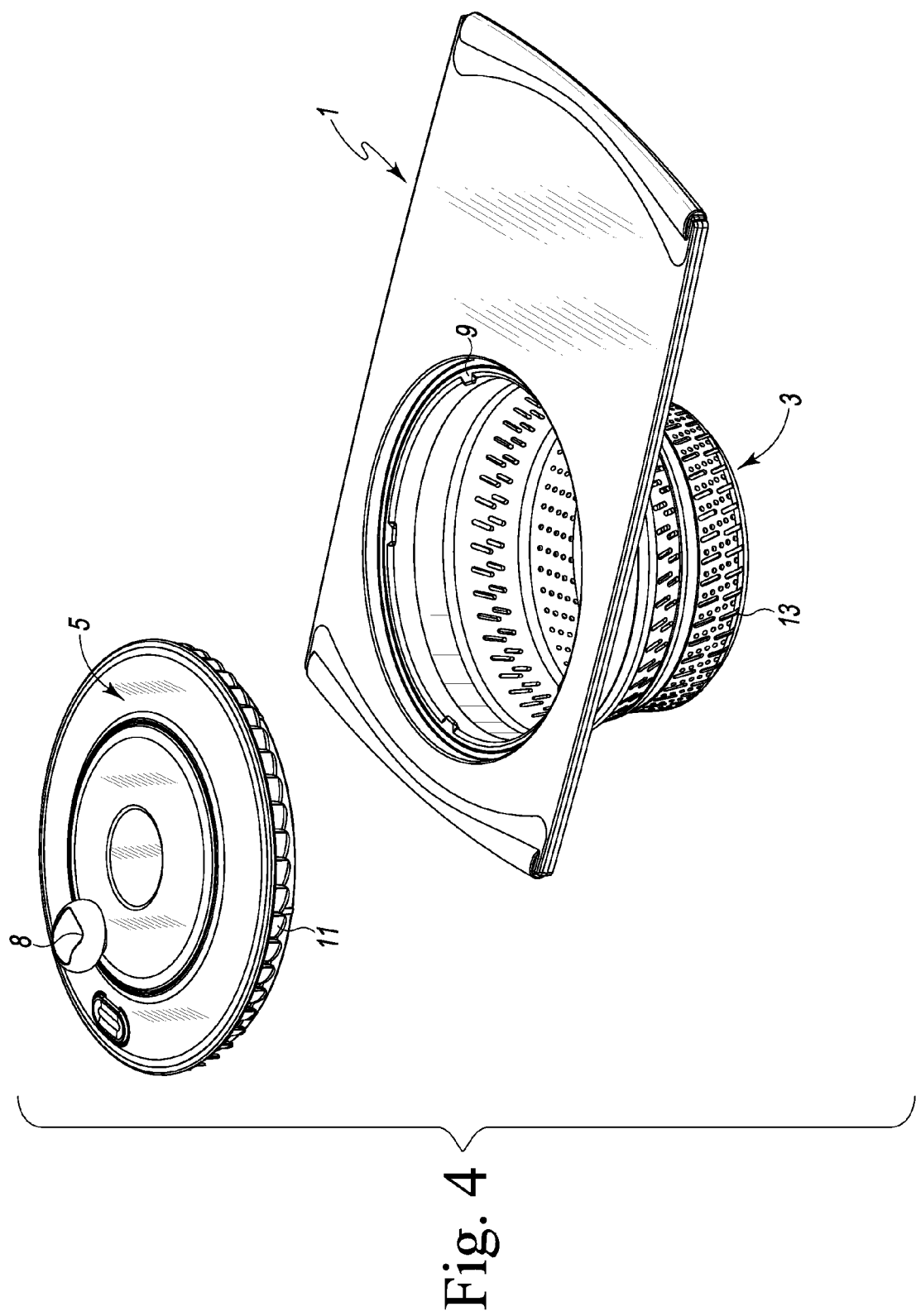
FIG. 4 is a perspective view of the Salad Spinner of FIG. 1 in the use configuration with the removable drive mechanism and fan removed.

As best shown in FIGS. 2 and 3, fan 7 is an air circulation device having a plurality of blades 7' angled with respect to a direction of rotation caused by the drive assembly 5, such that air from the outside of the salad spinner enters through radial vanes 11 and is forced into the colander 3 and out the colander holes 13.

Figure 5:
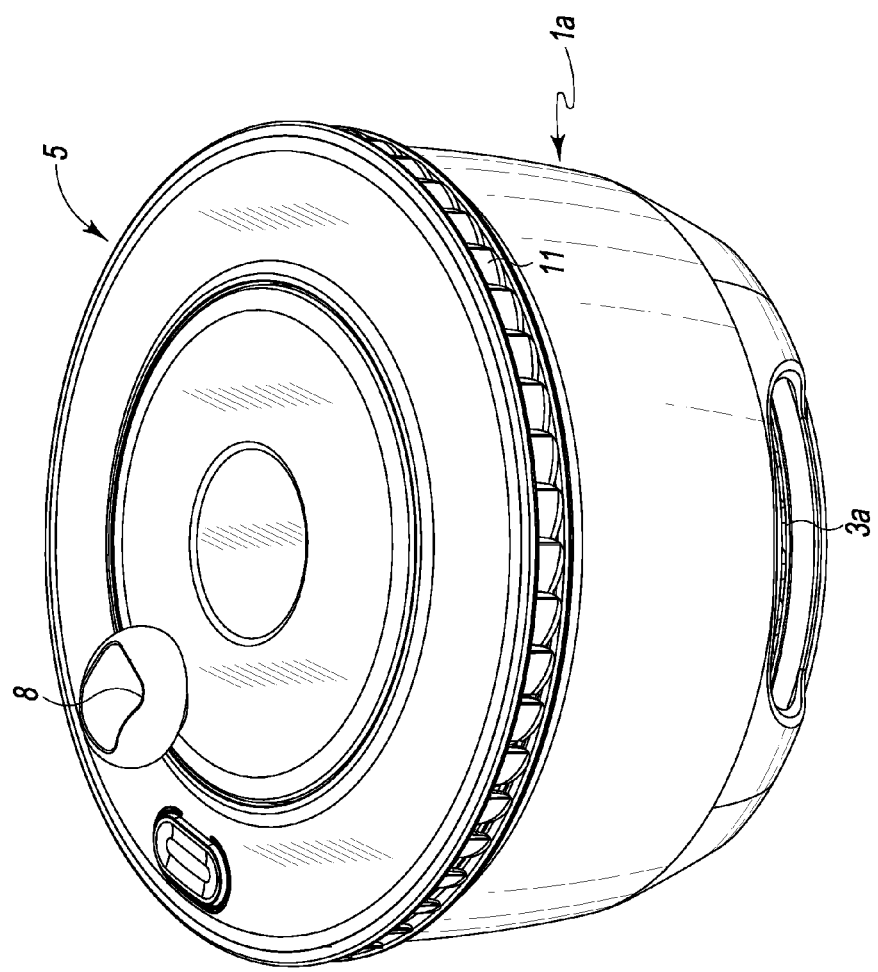
FIG. 5 is perspective view of a stand-alone second embodiment of the salad spinner with a rigid outer basket in the use configuration.
Figure 6:
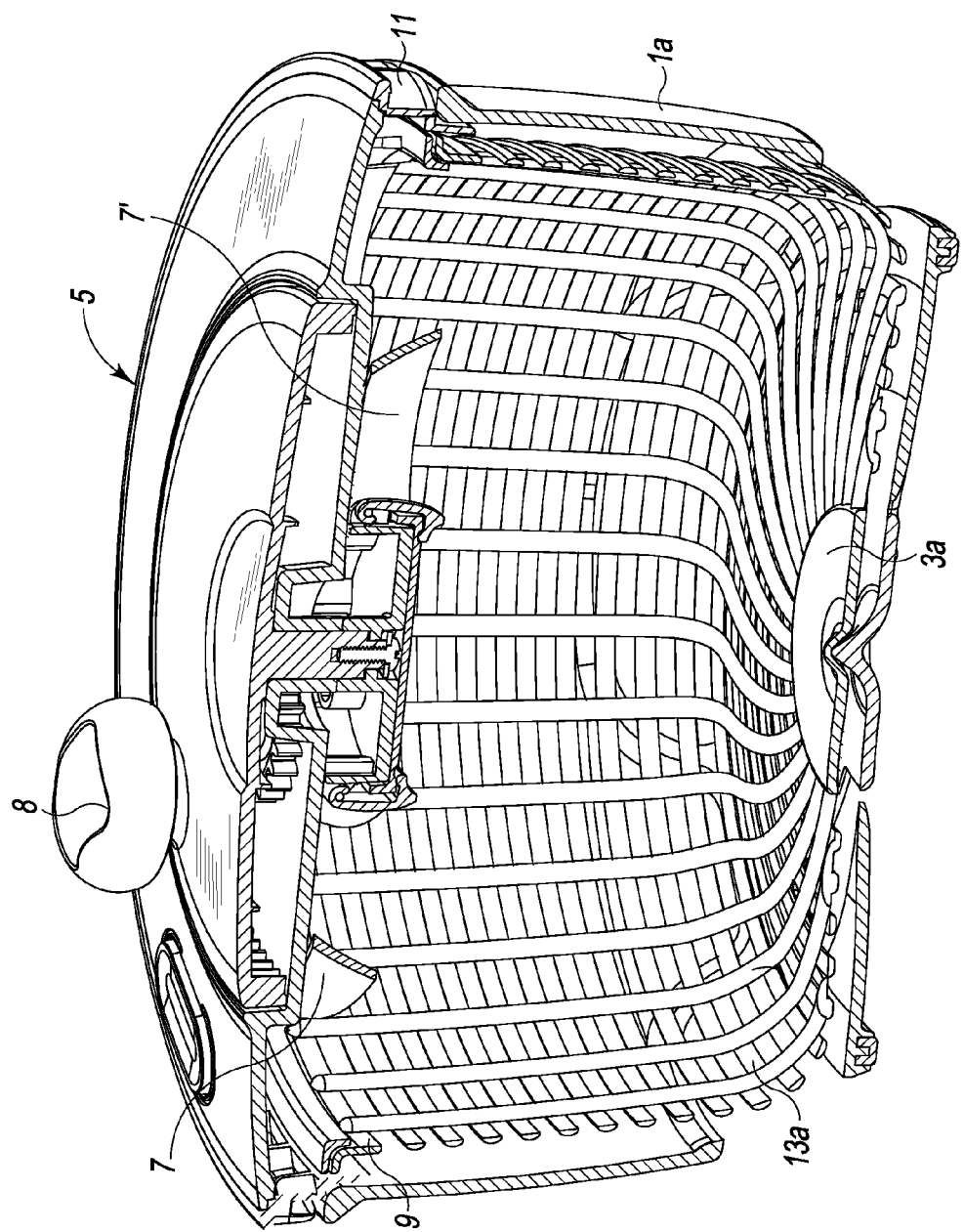
FIG. 6 is a cutaway perspective view of the salad spinner of FIG. 5.

Referring now to FIGS. 5 and 6, a second embodiment features a stand-alone support frame 1a configured to be supported by the bottom surface of a sink or basin, rather than the top perimeter of the sink or basin as with the previously described embodiment. Colander 3a, with colander holes 13a, is a traditional rigid colander as opposed to the collapsible, flexible colander 3. The remaining elements, including removable drive assembly 5, fan 7, and actuator 8, are substantially the same as previously described.

Again, as best shown in FIG. 6, fan 7 is an air circulation device having a plurality of blades 7' angled with respect to a direction of rotation caused by the drive assembly 5, such that air from the outside of the salad spinner enters through radial vanes 11 and is forced into the colander 3a and out the colander holes 13a.

Figure 7:
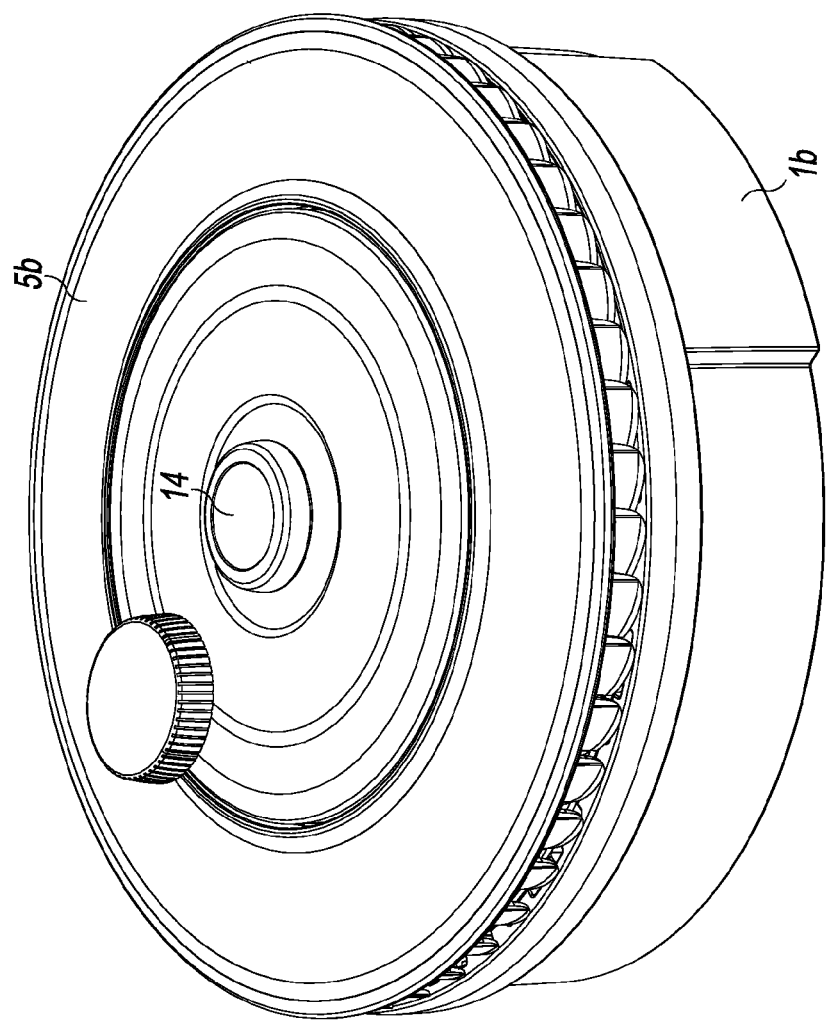
FIG. 7 is a top perspective view of a third embodiment of a salad spinner constructed in accordance with the invention, shown in a collapsed state for storage.
Figure 8:
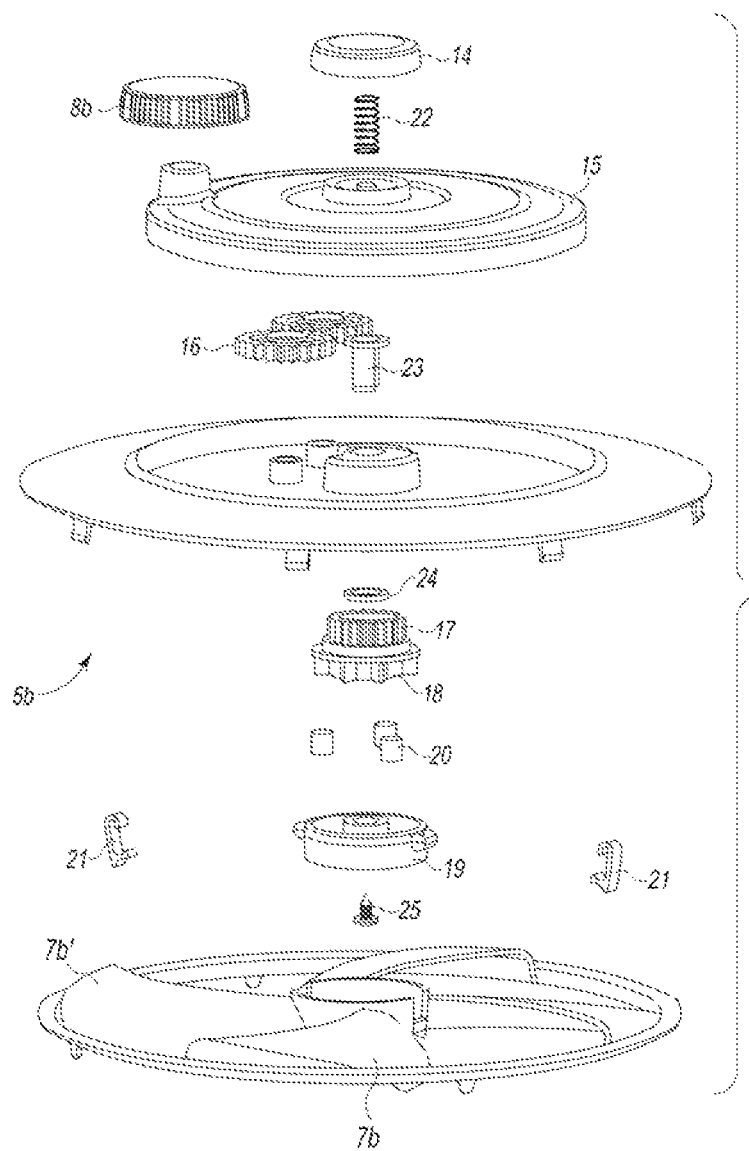
FIG. 8 is an exploded perspective view of the removable drive assembly of the third embodiment.

Referring now to FIGS. 7 and 8, a third embodiment has a collapsible support frame 1b configured to be shifted from a collapsed state for storage to an extended state for use. An internal colander (not shown) is also collapsible and extendable. Drive assembly 5b features a coaxial brake actuated by centrally-located button 14, which is the subject of our copending application Ser. No. 14/318,524, filed 27 Jun. 2014.

In the third embodiment, fan 7b has fewer, less steeply-angled blades 7b' than fan 7 of the first and second embodiments, which allow air flow to be optimized with respect to the designed rotation speeds imparted by the drive assembly 5b. Routine experimentation will allow the skilled artisan to match the air flow and rotation speed imparted by the drive assembly to achieve an acceptable combination of centrifugal water expulsion and air drying.

Drive assembly 5b includes an actuator 8b connected to a drive plate 15. Drive plate 15 is connected via a ring gear (not shown) in the bottom of drive plate 15 and gears 16, 17 to a one-way clutch 18, which drives a hub 19 by way of clutch cylinders 20. Hub 19 is attached to fan 7b by way of dogs 21. The coaxial brake includes spring 22, actuation element 23, and brake ring 24. Fastener 25 fixes the hub 19 to the drive plate 15.

Figure 9:
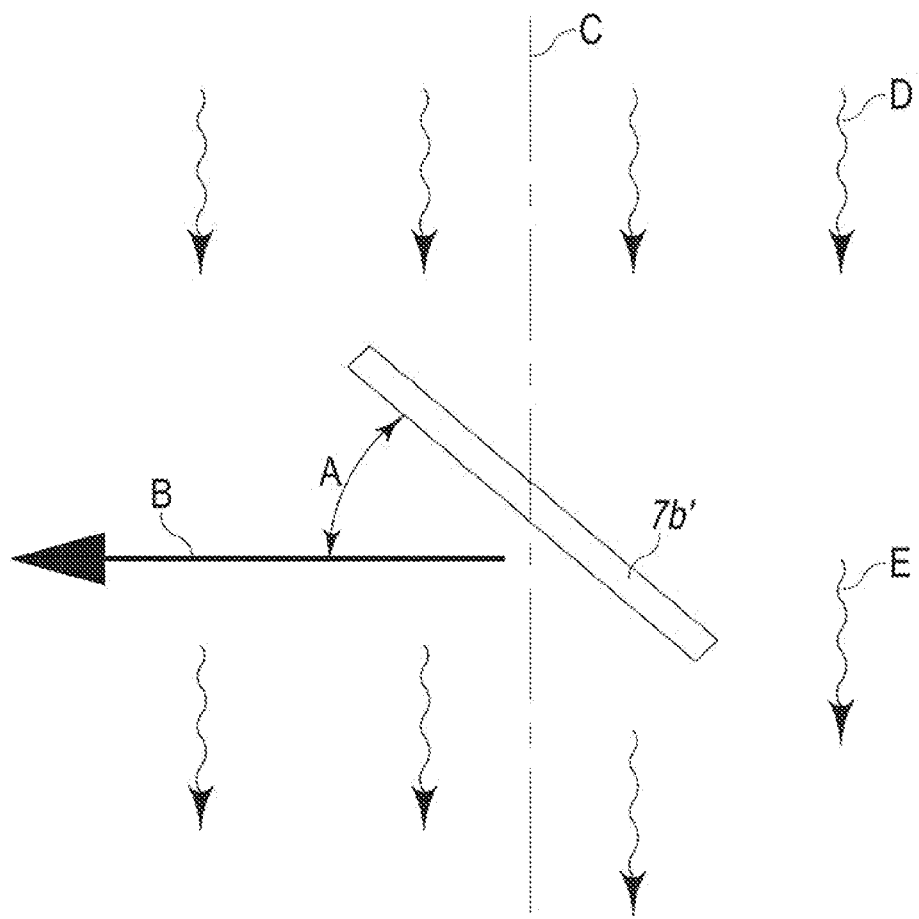
FIG. 9 is a diagrammatic view of a fan blade in operation.

Referring now to FIG. 9, blade 7b' is shown angled at Angle A with respect to horizontal direction B of rotation caused by the drive assembly 5 about central, vertical axis C. Air above the device is drawn to blade 7b' as illustrated by arrows D, and expelled away from blade 7b' below the device as illustrated by arrows E.

In operation, the salad spinner of this invention includes features that accelerate drying time while making less work for the user, including elements that create and promote dry airflow throughout the contents of the salad spinner device. The traditional interior engageable lid is changed to an engagement device containing a series of radial vanes shaped to draw in and direct dry air to a fan, which forces air onto and throughout the greens during the spinning process. The fast moving, drier air helps evaporate moisture from the surface of the greens and helps expel water through the container holes.

Next, in the first embodiment described this invention includes a novel arrangement that can be suspended over a sink. This not only eliminates the need for a rigid exterior bowl to catch and contain water, but it saves having to manually empty water from the bowl after use. Another feature is that the colander can be made collapsible, such that the colander can substantially reduce its size so the entire device can be assembled and stored in a limited space. Still another feature is the optional cutting surface for preparing food. Finally, the device can alternatively utilize a traditional secondary rigid exterior bowl to catch and contain water.

Though it is intended to fully describe the invention as set forth here, it is reasonable to assume that one skilled in the art could adjust, modify, subtract or adapt certain aspects of this salad spinner device without departing from its original scope. The implementation of individual or combined improvements disclosed here as part of another salad spinner device would be obvious. For example, adding any type of angled air-moving vanes to a new salad spinner device would be well within the bounds of what has been revealed herein. Another example would be to omit the rigidity of the colander and employ a collapsible version. Still another example would be to support or suspend this salad spinner device by another method such as with folding legs or a rigid outer bowl. The colander itself could, in fact, be freestanding—its lower end engaging with an electronic or manual drive component placed on the floor of a sink.

Various known drive mechanisms could include pull-chord escapements, levers, gear sets, plungers, and electric motors. Again, these mechanisms are not the subject matter of this disclosure. The gist of this improved salad spinner is that in addition to centrifugal force, its driven components include angled blades to force moving air to dry greens in less time with less effort. It can also function above or within a sink which keeps splashing water off countertops and eliminates the need for an exterior bowl. Lastly, its size can be reduced for storage in limited spaces.

The recommended materials will likely be, but are not limited to rigid and elastomeric plastic or metal.

While the invention has been illustrated and described as embodied in several alternative salad spinners, it is not intended to be limited to the details shown, since it will be understood that various omissions, modifications, substitutions and changes in the forms and details of the devices illustrated in their operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A salad spinner comprising:
    a support frame with a receiving aperture;
    a colander supported by the support frame in the receiving aperture for rotation about an axis of rotation;
    a removable drive assembly removably coupled to the support frame and colander and including an actuator to transmit a driving input applied to the actuator to rotate the colander; and
    a fan mechanically coupled to the actuator and removably coupled to the colander, the fan having a plurality of blades angled with respect to a horizontal direction of rotation about a central, vertical axis.

2. The salad spinner of claim 1, wherein the actuator is a manually operated rotating handle.

3. The salad spinner of claim 2, wherein the fan is mechanically coupled to the colander to transmit a driving input directly from the actuator.

4. The salad spinner of claim 1, wherein the removable drive assembly includes a plurality of spaced-apart stationary vanes to facilitate air flow into the colander.

5. The salad spinner of claim 1, wherein the support frame is a planar rigid surface.

6. The salad spinner of claim 1, wherein the support frame is an open-ended rigid container.

7. A salad spinner comprising:
    a support frame;
    a colander supported by the support frame for rotation about an axis of rotation;
    a removable drive assembly removably coupled to the support frame and colander; and wherein the removable drive assembly includes an actuator and a fan mechanically coupled to the actuator and removably coupled to the colander, the fan having a plurality of blades angled with respect to a horizontal direction of rotation about a central, vertical axis, wherein actuation of the actuator transmits a driving force to rotate the coupled fan and colander, and air above the blades is drawn to the blades, and air is expelled away from the blades below the blades.

8. The salad spinner of claim 7, wherein the actuator is a manually operated rotating handle.

9. The salad spinner of claim 7, wherein a plurality of spaced-apart stationary vanes are located adjacent to the fan to facilitate air flow into the colander.

10. The salad spinner of claim 7, wherein the support frame is a planar rigid surface.

11. The salad spinner of claim 7, wherein the support frame is an open-ended rigid container.

12. A salad spinner comprising:
a support frame with a receiving aperture;
a colander supported by the support frame in the receiving aperture for rotation about an axis of rotation;
a removable drive assembly removably coupled to the support frame and colander and including an actuator to transmit a driving input applied to the actuator to rotate the colander;
a fan mechanically coupled to the actuator and removably coupled to the colander, the fan having a plurality of blades angled with respect to a horizontal direction of rotation about a central, vertical axis;
wherein the actuator is a manually operated rotating handle;
wherein the fan is mechanically coupled to the colander to transmit a driving input directly from the actuator;
wherein the removable drive assembly includes a plurality of spaced-apart stationary vanes to facilitate air flow into the colander; and
wherein the support frame is an open-ended rigid container.

13. A salad spinner comprising:
a support frame;
a colander supported by the support frame for rotation about an axis of rotation;
a removable drive assembly removably coupled to the support frame and colander;
wherein the removable drive assembly includes an actuator and a fan mechanically coupled to the actuator and removably coupled to the colander, the fan having a plurality of blades angled with respect to a horizontal direction of rotation about a central, vertical axis, wherein actuation of the actuator transmits a driving force to rotate the coupled fan and colander, and air above the blades is drawn to the blades, and air is expelled away from the blades below the blades;
wherein the actuator is a manually operated rotating handle;
wherein a plurality of spaced-apart stationary vanes are located adjacent to the fan to facilitate air flow into the colander; and
wherein the support frame is an open-ended rigid container.

* * * * *